March 26, 1940.  C. C. HERSKIND  2,195,308
ELECTRIC TRANSLATING SYSTEM
Filed May 6, 1939
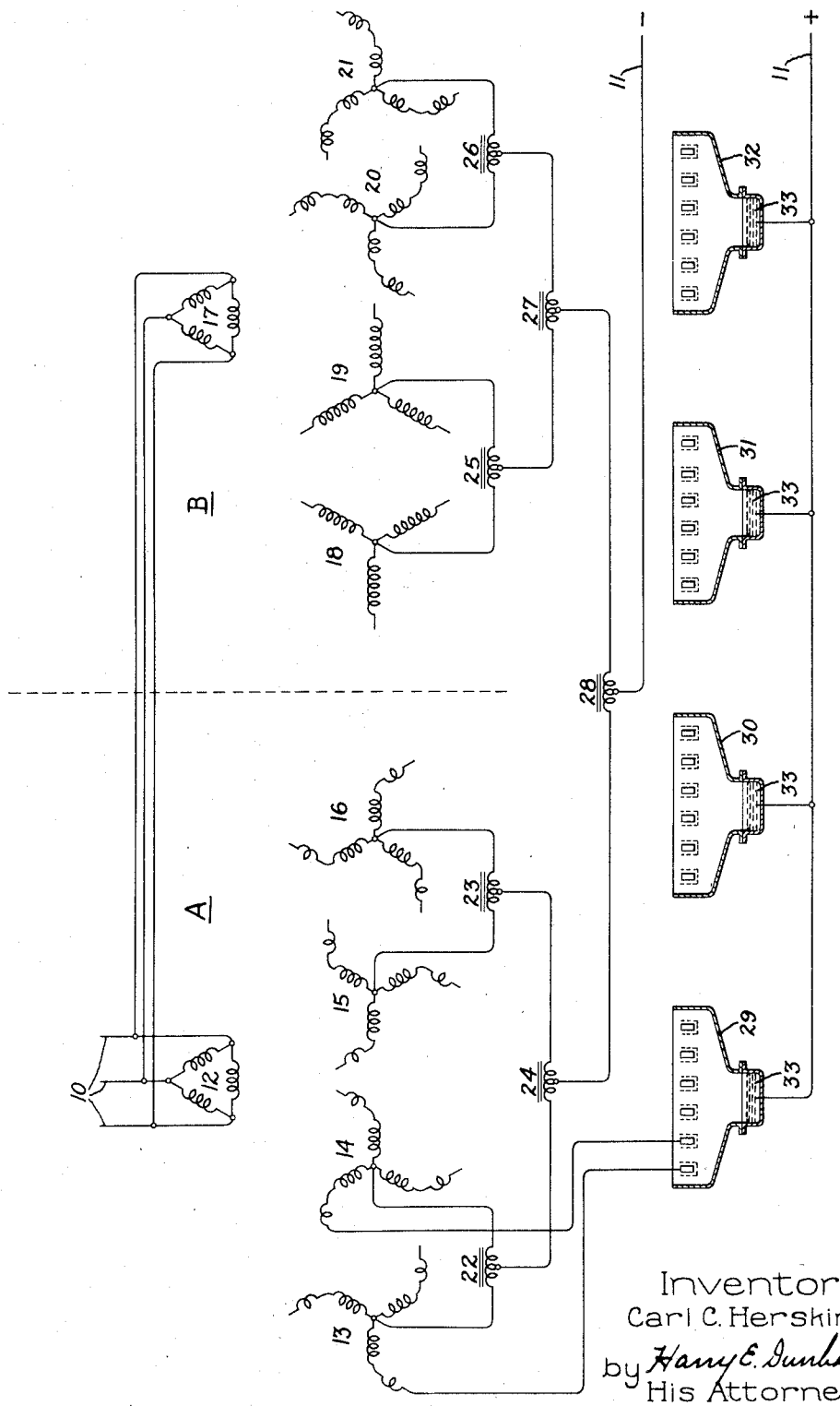
Inventor:
Carl C. Herskind,
by Harry E. Dunham
His Attorney.

Patented Mar. 26, 1940

2,195,308

UNITED STATES PATENT OFFICE 2,195,308

ELECTRIC TRANSLATING SYSTEM

Carl C. Herskind, Schenectady, N. Y., assignor to General Electric Company, a corporation of New York Application May 6, 1939, Serial No. 272,170

4 Claims. (Cl. 175—363)

My invention relates to electric translating systems and more particularly to such systems including transforming apparatus and electric valves for transmitting energy between a pair of electric translating circuits, the transforming apparatus being provided with a winding system comprising multiple polyphase networks operating in parallel. While my invention is of general application, it is particularly suitable for transmitting energy from a polyphase alternating current circuit to a direct current circuit through an electric valve converting apparatus.

It is well known in the art that when transmitting energy from an alternating current supply circuit to a direct current load circuit through an electric valve converting apparatus the voltage regulation of the system and the wave form of both the alternating and direct current circuits are improved and the inductive interference decreased by increasing the equivalent number of phases of the secondary windings of the transformer in any of several well known manners. Furthermore, since the capacity of electric valve converting apparatus has been increased in a greater proportion relative to the increase in capacity of generating plants, it becomes necessary to increase the number of phases of the electric valve converting apparatus in order to prevent overheating of the rotors of the generating apparatus. Up to the present time it has been economically feasible to provide electric translating systems up to twelve phases but difficulties have been encountered when it has been desired to increase the number of phases beyond this. Complicated transformer arrangements have been suggested by which the number of phases of electric valve translating systems might be increased beyond twelve phases. However, in all of these arrangements the primary and secondary winding arrangements of the network transformers have been quite complicated and it has been impossible to use simple tap changing equipment or other apparatus in this connection. In order to secure a good utilization of the electric valve converting apparatus, it is desirable to have several anodes effective simultaneously and thus the secondary windings of the transformer must be arranged through midtap reactors, known as interphase transformers, to insure the desired parallel operation. In providing such arrangement utilizing multiple phase networks it has been found desirable to so proportion the reactances of the component elements of each phase of said networks that when the networks are carrying current in proportion to their ratings their resultant counter-electromotive forces will have the same vectorial relation to their respective terminal voltages. Furthermore, it has been found necessary to prevent unbalance between the multiple secondary networks which may be occasioned by any inequalities in the line-to-neutral impedance of the several phases of the multiple secondary networks. It is also necessary to prevent any substantial unbalance in load between the multiple secondary networks so as to prevent the lowering of the efficiency of the apparatus which decreases its rating and when used in connection with electric valve converting apparatus increases the susceptibility to arc backs and other disturbances in the system. Heretofore, it has been found economically impractical and physically extremely difficult to provide transformer means for electric valve converting apparatus for more than twelve phases wherein the several transformers used have very similar connections or at least similarly connected primaries, and yet wherein it has been possible to obtain the necessary phase displacements without sacrificing the utilization factor of the electric valve converting apparatus.

It is an object of my invention to overcome the disadvantages above noted in connection with electric valve converting systems for transmitting energy between a pair of electric translating circuits.

It is another object of my invention to provide a 24-phase electric valve converting apparatus comprising a plurality of transformers wherein the phase displacement is obtained in the secondary windings so that the transformers may be constructed with similarly connected primaries thereby eliminating complications when tap changing equipment or the like is to be used.

A further object of my invention is to provide an improved electric translating system for transmitting energy between a pair of electric translating circuits by means of transforming apparatus having winding systems comprising multiple polyphase networks operating in parallel which will be simple, reliable and economical in operation.

It is a still further object of my invention to provide an improved electric translating system for transmitting energy between a pair of electric translating circuits by means of transforming apparatus having a winding system comprising a plurality of multiple polyphase networks of a greater number than was possible heretofore by means of which an equal division of load between the multiple secondary networks may be insured.

It is another object of my invention to provide an electric translating system for transmitting energy between a pair of electric translating circuits by means of a plurality of transformers having similarly connected primary windings and yet wherein the advantages of quadruple zigzag secondary windings may be retained.

In accordance with the illustrated embodiment of my invention, I provide a 24-phase electric valve converting apparatus interconnecting a polyphase supply circuit with a direct current load circuit. In order to obtain 24-phase operation a pair of transformers is provided each being provided with a similarly connected polyphase primary winding so that if tap changing apparatus is to be used all complications will be eliminated. The secondary windings of one of these transformers are connected in quadruple zigzag while the secondary windings of the other transformer are made up of two parts, one a double Y network and the other a double zigzag Y network. In order to obtain parallel operation of the various secondary networks interphase transformers are connected in the conventional manner well known to those skilled in the art.

For a better understanding of my invention, reference may be had to the following description taken in connection with the accompanying drawing in which the single figure thereof diagrammatically represents an embodiment of my invention and its scope will be pointed out in the appended claims.

Referring now to the single figure of the drawing, I have illustrated therein a system embodying my invention for transmitting energy from a polyphase alternating current supply circuit 10 having three phases, to a direct current load circuit 11. The system includes a transforming apparatus comprising two transformers A and B. The first of these transformers comprising a 3-phase primary network 12 which may be delta connected and supplied from the alternating current circuit 10. The secondary winding of transformer A comprises four secondary networks 13, 14, 15 and 16 connected in quadruple zigzag. Each phase of these secondary networks comprises a main winding or long coil inductively related to one of the primary phases. The networks 13 and 14 have connected in series with the long coils auxiliary or short coils energized from the next preceding primary phase but reversed in polarity so that the resultant voltage obtained from this combination of long and short coils is advanced in phase with respect to the voltage which would be obtained from the long coils alone. These two networks 13 and 14 are said to be forwardly zigzagged. On the other hand the networks 15 and 16 have their auxiliary or short coils energized from the next succeeding primary phase also reversed in polarity so as to retard the phase of the resultant voltage. These networks are said to be backwardly zigzagged, that is, they are zigzagged in opposition to the networks 13 and 14. The long and short coils of the several networks 13, 14, 15 and 16 are so proportioned as to produce voltage components which are displaced in phase from one another by thirty electrical degrees. It will be understood by those skilled in the art that the several windings of transformer A may be wound on a single polyphase core, or may comprise a bank of single phase transformers connected in polyphase relation or may be wound on two 3-phase cores in which case secondaries 13 and 14 would be wound on one core and secondaries 15 and 16 would be wound on the other core.

By means of transformer A twelve phases are provided. In order to provide twelve additional phases by an economical means which will produce the desired operation, which will not introduce any unbalance, and also which enables one to use a primary winding connected similarly to the primary winding of transformer A so that any complications which one might encounter if tap changing were desired would be eliminated, a second transformer B is provided having a delta connected primary 17 supplied from the alternating load circuit 10. Transformer B also includes four 3-phase Y-connected secondaries, 18, 19, 20 and 21. Secondary networks 18 and 19 are connected in conventional Y each having single windings associated with the individual phases of transformer primary 17. Secondary networks 20 and 21 are connected in zigzag Y, each phase comprising a pair of coils of equal length one of which is associated with one phase of the primary winding while the other is associated with another phase of the primary winding. Networks 20 and 21 are said to be forwardly zigzagged similar to networks 13 and 14 described above. Transformer B may be arranged on a 3-phase core or cores or on single phase cores in the same manner as was described for transformer A. Also transformers A and B may be wound on a single core. As is well known to those skilled in the art in this latter case or when each transformer is wound on a single core, the secondary windings of transformers A and B may be interlaced with the primaries in the conventional manner. The neutral points of secondary networks 13 and 14 are interconnected by an inductive winding or interphase transformer 22, while the neutral points of secondary networks 15 and 16 are interconnected by an inductive winding of interphase transformer 23. The midpoints of interphase transformers 22 and 23 are interconnected through another inductive winding or interphase transformer 24. Similarly, the neutral points of secondary networks 18 and 19 are interconnected through an interphase transformer 25 and the neutral points of secondary networks 20 and 21 are interconnected through interphase transformer 26. Also the midpoints of interphase transformers 25 and 26 are interconnected through interphase transformer 27. The midpoints of interphase transformers 24 and 27 are interconnected through another inductive winding or interphase transformer 28, the midpoint of which is connected to one side of the direct current circuit 11. Each of the outer extremities of the polyphase secondary networks 13 and 14 are connected to one of the anodes of the electric discharge device 29. For the sake of simplicity in the drawing only two of such outer extremities of networks 13 and 14 have been shown connected to the anodes but it will, of course be well understood that each of the other outer extremities are similarly connected to the remaining anodes of electric discharge device 29. Similarly, the outer extremities of networks 15 and 16 are connected to the anodes of electric discharge device 30 and the outer extremities of secondary networks 18 and 19 are connected to the anodes of electric discharge device 31, while the outer extremities of secondary networks 20 and 21 are connected to the anodes of electric discharge device 32. The cathodes 33 of each of the electric discharge devices 29 to 32 are connected to the other side of the direct current circuit 11. The terminal voltages of the polyphase secondary networks 13 to 16 are so displaced that without the use of the interphase transformers 22, 23 and 24 each anode of discharge devices 29 and 30 would conduct current for only 30 electrical degrees in each cycle. By the use of the interphase transformers, four anodes of the discharge devices 29 and 30 are simultaneously conductive, each conducting current for 120 electrical degrees during each cycle, the several networks 13 to 16 thereof operating in parallel to supply current to the direct current circuit 11. The manner in which the translating device comprising transformer A is constructed is described in greater detail in United States Letters Patent No. 1,895,370, granted January 24, 1933 upon the application of Aram Boyajian, and in United States Letters Patent No. 2,009,166, granted July 23, 1935, upon the application of Earl V. DeBlieux.

The secondary windings 18 to 21 of transformer B, similarly, will produce 12-phase operation, the respective voltages being displaced from one another by 30 electrical degrees. In this manner an additional 12-phase network is obtained from transformer B the terminal voltages of which differ in phase from the terminal voltages of the secondary windings of transformer A by 15 electrical degrees.

It will be observed that I have provided an arrangement including a pair of transformers A and B with similarly connected primary windings 12 and 17 of simple delta form whereby, as is well understood by those skilled in the art, all complications are eliminated if it is desired to use tap changing equipment for controlling the output of the electric valve converting apparatus.

While I have shown transformers A and B each with delta connected primaries, it will be understood by those skilled in the art that Y connected primaries could be substituted.

While each of the electric valves 29, 30, 31 and 32 have been shown as comprising a plurality of anodes each provided with electrodes or grids all contained within an envelope having a single cathode 33, it of course will be understood that a plurality of individual devices or still other arrangements of electric valve converting apparatus may be utilized. Also it is preferable to utilize electric valve converting apparatus of a type having an anode and a cathode enclosed within an envelope containing an ionized medium. The use of control grids of course will facilitate the regulation of the voltage output appearing across the direct current circuit 11, but it is to be understood that the use of control grids or ignitor control electrodes is not essential to the operation of this system.

Since the general principles of operation of the above described electric valve converting apparatus will be well understood by those skilled in the art, no detailed operation thereof will be given. By the use of the various interphase transformers which have considerable reactance the transfer of current between the terminals associated with the different networks may be minimized to any desired extent so that the current will commutate only between those terminals associated with the same networks. Under these conditions each anode of the electric valve converting apparatus 29, 30, 31 and 32 will be connected simultaneously, each anode conducting current for 120 electrical degrees during each cycle, and the several networks 13, 14, 15, 16, 18, 19, 20 and 21 will operate in parallel to supply current to the direct current circuit 11. The reactances of the transformers may be so designed that the impedance drop in each phase of the multiple windings are substantially equal so that the load current is approximately equally divided between the multiple windings.

While I have shown and described a particular embodiment of my invention as applied to an electric translating system, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In a 24-phase electric valve converting system, a polyphase alternating current supply circuit, a direct current load circuit, a plurality of electric valves associated with said load circuit, translating means for interconnecting said electric valves and said supply circuit comprising two parallel connected transformers each provided with similarly connected primary windings connected to said supply circuit, one of said primary windings having associated therewith four groups of polyphase secondary networks connected in quadruple zigzag and inductively related to the plurality of phases of said primary winding, the other of said primary windings having associated therewith four groups of polyphase secondary networks two of which are connected in double Y and the other two in zigzag Y relation whereby said last mentioned secondary networks operate to produce voltage components differing in phase from the voltage components supplied by said quadruple zigzag secondary network, and means for causing the parallel operation of all of said secondary networks.

2. The combination in a 24-phase electric valve converting system, a polyphase alternating current supply circuit, a direct current load circuit, a plurality of electric valves associated with said load circuit, transforming means interconnecting said valves and said supply circuit and including a pair of primary and secondary winding systems, each of said primary winding systems comprising similarly connected polyphase networks connected to said supply circuit, one of said primary winding systems having inductively associated therewith four groups of polyphase secondary networks connected in quadruple zigzag, the other of said primary winding systems having inductively associated therewith a secondary winding system comprising four groups of polyphase networks, two of which are connected in zigzag Y while the other two are connected in double Y, whereby said last mentioned secondary winding system operates to produce voltage components differing in phase from the voltage components supplied by said quadruple zigzag secondary network, and interphase transformer means for interconnecting said secondary winding systems whereby parallel operation of all the secondary networks is obtained.

3. The combination in a 24-phase electric valve converting system, a polyphase alternating current supply circuit, a direct current load circuit, a plurality of electric valves associated with said load circuit, transforming means interconnecting said valves and said supply circuit and including a plurality of cores upon which are wound a plurality of primary and secondary winding systems, each of said primary winding systems comprising similarly connected polyphase networks connected to said supply circuit, and each having inductively associated therewith a plurality of groups of polyphase secondary networks arranged so as to produce voltage components differing in phase from one another, and interphase transformer means for interconnecting said secondary winding systems whereby parallel operation of all of the secondary networks is obtained.

4. In a 24-phase electric valve converting system, a polyphase alternating current supply circuit, a direct current load circuit, a plurality of electric valves associated with said load circuit, translating means for interconnecting said electric valves and said supply circuit including a pair of transformer cores, each having a primary winding and a 12-phase secondary winding system wound upon said cores, said primary windings comprising similarly connected polyphase networks energized from said supply circuit, a plurality of groups of secondary networks associated with each of said primary windings and arranged so as to produce voltage components differing in phase from one another by 15 electrical degrees, and interphase transformer means for allowing parallel operation of said secondary winding systems.

CARL C. HERSKIND.